US008639480B2

(12) United States Patent
Arnold et al.

(10) Patent No.: US 8,639,480 B2
(45) Date of Patent: Jan. 28, 2014

(54) METHODS AND SYSTEMS FOR MODELING TURBINE OPERATION (75) Inventors: Robert Walter Arnold, Greenville, SC (US); Christopher Eugene Long, Greenville, SC (US); Matthew John Mosley, Greenville, SC (US); David Spencer Ewens, Greenville, SC (US)

(73) Assignee: General Electric Company, Schenectady, NY (US)

( * ) Notice: Subject to any disclaimer, the term of this patent is extended or adjusted under 35 U.S.C. 154(b) by 613 days.

(21) Appl. No.: 12/886,120

(22) Filed: Sep. 20, 2010

(65) Prior Publication Data

US 2012/0072194 A1 Mar. 22, 2012

(51) Int. Cl.
*G06F 17/50* (2006.01)

(52) U.S. Cl.
USPC .................. 703/2; 703/6; 415/118; 428/469

(58) Field of Classification Search
USPC .............................. 703/2, 6; 428/469; 415/118
See application file for complete search history.

(56) References Cited

U.S. PATENT DOCUMENTS

| 5,748,500 | A * | 5/1998 | Quentin et al. ............... 702/182 |
| 7,489,990 | B2 | 2/2009 | Fehr et al. |
| 7,582,359 | B2 * | 9/2009 | Sabol et al. .................. 428/469 |
| 2004/0123600 | A1 * | 7/2004 | Brunell et al. ................ 60/773 |
| 2006/0056959 | A1 * | 3/2006 | Sabol et al. .................. 415/118 |
| 2007/0055392 | A1 | 3/2007 | D'Amato et al. |
| 2008/0243352 | A1 | 10/2008 | Healy |
| 2009/0056413 | A1 | 3/2009 | Rao et al. |
| 2009/0173078 | A1 | 7/2009 | Thatcher et al. |
| 2009/0292436 | A1 | 11/2009 | D'Amato et al. |
| 2010/0117859 | A1 * | 5/2010 | Mitchell et al. ......... 340/870.16 |

FOREIGN PATENT DOCUMENTS

| DE | 10 2008 002 610 A1 | 1/2009 |
| JP | 2003-83089 A | 3/2003 |
| WO | 2009156299 A2 | 12/2009 |

OTHER PUBLICATIONS

Search Report issued in connection with EP Application No. 11180141.1, Jul. 16, 2012.

* cited by examiner

*Primary Examiner* — Thai Phan
(74) *Attorney, Agent, or Firm* — Sutherland Asbill & Brennan LLP (57) ABSTRACT Methods and systems for modeling turbine operation are disclosed. In one embodiment a method for modeling turbine operation may include: determining current performance parameters of a turbine; providing at least one external factor for current or future operation of the turbine; and modeling, by a predictive model, at least one operating characteristic of the turbine based at least in part on the current performance parameters of the turbine and the at least one external factor.

20 Claims, 5 Drawing Sheets

FIG. 4

METHODS AND SYSTEMS FOR MODELING TURBINE OPERATION

TECHNICAL FIELD

The invention relates generally to turbine modeling and control systems, and more particularly relates to providing methods and systems for modeling turbine operation.

BACKGROUND OF THE INVENTION

Industrial and power generation turbines have control systems ("controllers") that monitor and control their operation. These controllers govern the combustion system of the turbine and other operational aspects of the turbine. For illustrative purposes, a gas turbine is described herein; however, it is appreciated that the embodiments may also apply to other turbine types and are not limited to gas turbine modeling or control. The controller may execute scheduling algorithms that adjust the fuel flow, inlet guide vanes ("IGV"), and other control inputs to ensure safe and efficient operation of the turbine.

Typically, output (e.g., power production) of a turbine can vary significantly with changes in external factors that cannot be controlled. Example uncontrollable external factors include ambient conditions, such as temperature, humidity, pressure, etc. These factors can cause operating inefficiencies as the external factors change, making it difficult to predict and control turbine performance at a given operating condition prior to actually experiencing the changing behavior. In addition, machine degradation that is not accounted for can also increase the difficulties to predict and control turbine performance.

As one example, grid compliance and dispatch planning may be affected adversely by controlling a turbine in a relatively static manner, using static control profiles, such as heat rate curves gathered from only periodic performance tests of turbine operation. Between these periodic updates, turbine performance may change (e.g., from degradation), which may affect start-up and load performance and operating characteristics. Moreover, intraday changes in these external factors, without accounting for the same in the turbine control profiles, may in turn cause inefficient turbine operation. To compensate for these generally unaccounted for changes, turbine operation may be controlled in an overly conservative manner, not achieving the full utilization, output, and thus operating efficiency as possible.

Without identifying the short-term inefficiencies and/or long-term deterioration as it occurs, a conventional schedule-based turbine control system will either have to be re-tuned periodically, have operating boundaries set artificially low (or high as some boundaries might require) to preemptively accommodate component deterioration, or risk violating operational boundaries that may lead to excessive fatigue or failure. Similarly, conventional schedule-based turbine control systems may also not be able to effectively accommodate changing conditions (e.g., gas quality, ambient conditions, etc.) to either tune for the most efficient operation or to avoid violation of component operational limits.

Thus, there exists a need for methods and systems for modeling turbine operation.

BRIEF DESCRIPTION OF THE INVENTION

Embodiments of the invention can address some or all of the needs described above. According to one embodiment, a method for modeling turbine operation is provided. The method may include: determining current performance parameters of a turbine; providing at least one external factor for current or future operation of the turbine; and modeling, by a predictive model, at least one operating characteristic of the turbine based at least in part on the current performance parameters of the turbine and the at least one external factor.

According to another embodiment, a system for modeling turbine operation is provided. The system may include at least one controller in communication with a turbine. The controller may be configured to: determine current performance parameters of a turbine; provide at least one external factor for current or future operation of the turbine; and model, by a predictive model, at least one operating characteristic of the turbine based at least in part on the modeled current performance parameters of the turbine and the at least one external factor.

According to yet another embodiment of the invention, a method for modeling a turbine is provided. The method may include: receiving multiple operating parameters associated with the current operation of a turbine; modeling, by a primary model, current performance parameters of the turbine based at least in part on the operating parameters; receiving a determination of at least one external factor; providing, as inputs to a predictive model, one or more outputs of the primary model and the at least one external factor, wherein the one or more outputs reflect the current operating state of the turbine; and modeling, by the predictive model, at least one operating characteristic of the turbine, wherein the at least one operating characteristic of the turbine is based at least in part on the current state of the turbine and the at least one external factor.

Other embodiments and aspects of the invention will become apparent from the following description taken in conjunction with the following drawings.

DETAILED DESCRIPTION OF THE INVENTION

Example embodiments of the invention now will be described more fully hereinafter with reference to the accompanying drawings, in which some, but not all embodiments are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

According to an example embodiment of the invention, a turbine control system may include first and second instances of a model that models turbine operating behavior, such as by utilizing physics-based models or mathematically modeling (e.g., transfer functions, etc.). The first model (also referred to as a "primary model") may provide current performance parameters of a turbine, which indicate turbine behavior and corresponding operating parameters of the turbine. As used herein, "parameters" refer to items that can be used to define the operating conditions of the turbine, such as, but not limited to, temperatures, pressures, gas flows at defined locations in the turbine, and compressor, combustor, and turbine efficiency levels, etc. Performance parameters may also be referred to as "model correction factors," referring to factors used to adjust the first or second models to reflect the operation of the turbine. Inputs to the first model may be sensed, measured, or otherwise provided by an operator. In addition to current performance parameters, the control system may further receive or otherwise obtain information on external factors that may affect the current operation of the turbine or future operation of the turbine. External factors may include, but are not limited to, ambient conditions, such as temperature, barometric pressure, humidity, and the like. Accordingly, the second model (also referred to as a "secondary model" or a "predictive model") is generated to identify or predict one or more operating characteristics of the turbine, taking into consideration the current performance parameters and the one or more external factors identified. Example operating characteristics of the turbine include, but are not limited to, actual turbine behavior such as, exhaust temperature, turbine output, compressor pressure ratios, heat rate, emissions, fuel consumption, expected revenues, and the like. Therefore, this second or predictive model may be utilized to indicate or predict turbine behavior at operating points, objectives, or operating conditions different than the current operation. As used herein, the term "model" refers generally to the act of modeling, predicting, or indicating based on the output of the model. It is appreciated that, while the term "second model" is utilized herein, in some instances there may be no difference between the formulation of the first and second models, such that the "second model" represents running the first model with adjusted parameters or additional or different input.

Accordingly, by modeling the turbine operating behavior utilizing the second or predictive model that considers the external factors or different operating conditions, turbine control can be adjusted to more effectively and efficiently operate under these different operating conditions or in light of the external factors considered. This system therefore allows automated turbine control based on modeled behavior and operating characteristics. In addition, the described modeling system allows creating operator specified scenarios, inputs, operating points, operating objectives, and/or operating conditions to predict turbine behavior and operating characteristics at these operator specified conditions. Predicting such hypothetical scenarios allows operators to make more informed turbine control and operating decisions, such as scheduling, loading, turn-down, etc. As used herein, the term "operating points" refers generally to operating points, conditions, and/or objectives, and is not intended to be limiting. Thus, an operating point may refer to an objective or setpoint, such as base load, turndown point, peak fire, and the like.

One example use of the described turbine modeling system includes adjusting turbine operation to satisfy grid compliance requirements while still operating at the most efficient levels. For example, regional grid authorities typically prescribe requirements that power generation plants be able to support a grid during frequency upsets. Supporting the grid during upsets involves increasing or decreasing turbine load under certain conditions, depending upon the grid state. For example, during an upset, a power plant is expected to increase its power generation output (e.g., by as much as 2%) to compensate for other supply deficiencies. Therefore, turbine operation typically constrains the base load point to allow for the turbine to be operated at a margined output level (also referred to as the "reserved margin") so that the increased load, if necessary, can be provided without incurring the additional maintenance factor associated with over firing. As one example, the reserved margin may be 98% of what base load would typically be, thus allowing increasing load to accommodate grid requirements (e.g., increasing 2%) without exceeding the 100% base load. However, external factors, such as temperature, humidity, or pressure, can adversely impact turbine efficiency. As a day heats up, a turbine may not have that 2% reserve that it may need because the heat has caused the turbine to operate less efficiently and the turbine cannot reach that 100% load as originally planned for. To compensate, conventional heat-rate curves cause operating the turbine in a more efficient state throughout the entire day in light of the possible machine efficiency loss (e.g., at 96%, etc.). The turbine modeling system described herein, however, allows modeling turbine behavior in real-time according to the current external factors (e.g., temperature, humidity, pressure, etc.), and thus controlling turbine operation to most efficiently operate given the current ambient conditions. Similarly, future turbine behavior can be predicted, such as to predict turbine behavior responsive to a day's heat fluctuation, allowing for turbine operation planning to achieve the most efficient and economically viable operation.

As another example, power generation plants typically make decisions whether to shut turbines down at night or to simply reduce output levels (e.g., turn down). Turbine operating characteristics, such as emissions, exhaust temperature, and the like, impact this decision. Utilizing the turbine modeling system described herein, decisions can be made on a more intelligent basis, either before hand or in real-time or near real-time. For example, external factors and/or expected turbine operating points can be supplied to the second model to determine what the turbine operating characteristics would be. Thus, the modeled characteristics may be utilized to determine whether a turbine should be shut down or turned down, considering these characteristics (e.g., efficiency, emissions, cost, etc.).

As yet another example, a turbine modeling system may be utilized to evaluate the benefit of performing turbine maintenance at a given time. For example, the turbine modeling system can be utilized to model the operating characteristics of the turbine at its current capabilities based at least in part on the turbine's current performance parameters. Then, an operator specified scenario can be generated that models the turbine's operating characteristics if maintenance is performed (e.g., improving the performance parameter values). For example, as turbines degrade over time, the performance parameters reflect machine degradation. In some instances, maintenance can be performed to improve those performance parameters and, thus, the operating characteristics of the turbine. By modeling or predicting the improved operating characteristics, a cost-benefit analysis can be performed to compare the benefit gained by performing the maintenance (as predicted by the modeling system) with the costs incurred.

It is appreciated that the turbine modeling system described herein may be applied to any number of situations, and that the aforementioned examples and technical effects are provided for illustrative purposes only and are not intended to be limiting.

Example embodiments are now described with reference to FIGS. 1-4.

Figure 1A:
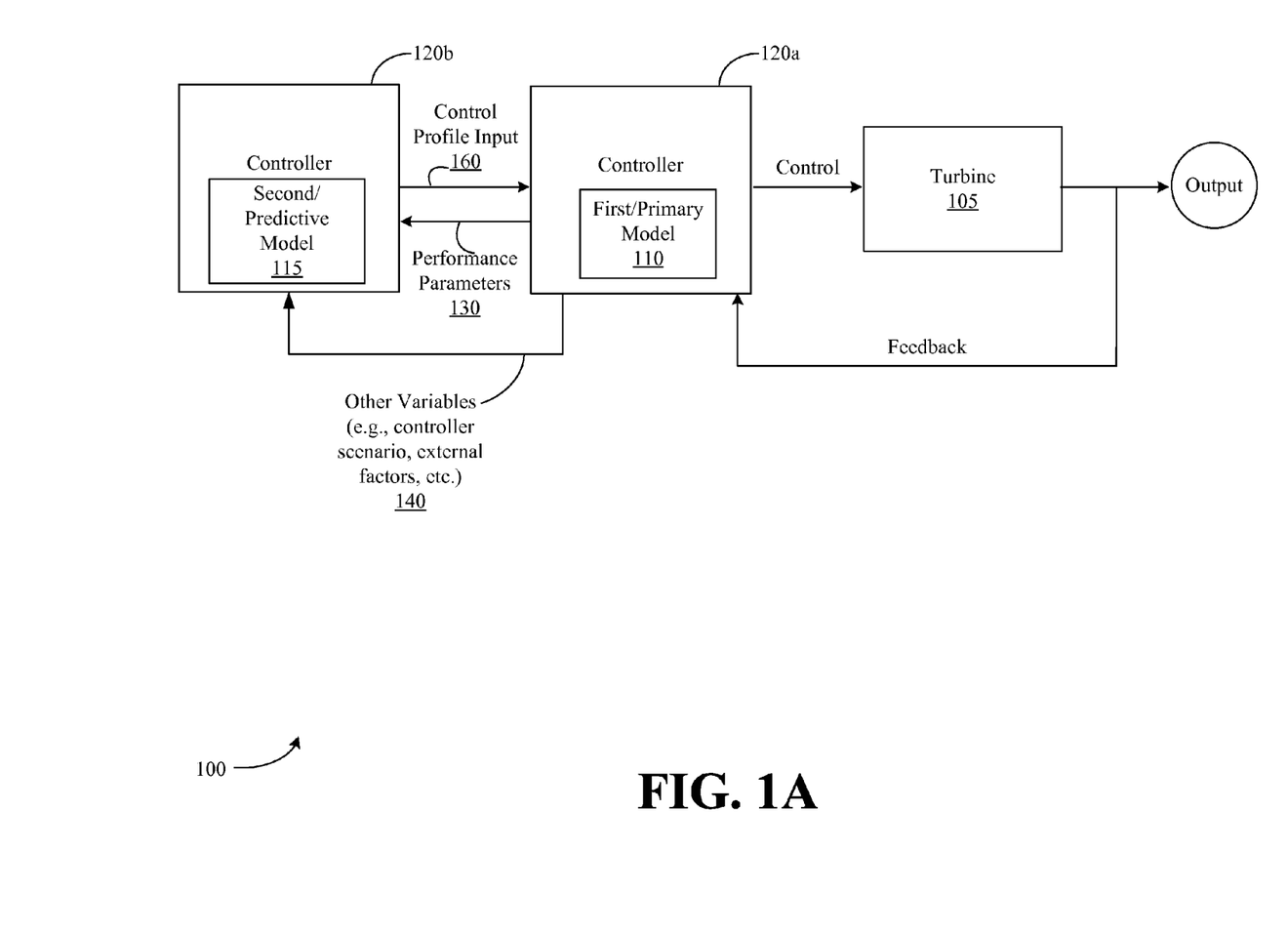
FIGS. 1A-1B are block diagrams illustrating turbine models, according to example embodiments.

FIG. 1A illustrates an example system 100 operable for modeling turbine operating behavior, according to one embodiment. According to this embodiment, at least one turbine 105 is provided to be modeled by the modeling system. In one embodiment, the turbine 105 may be a gas turbine having a compressor and a combustor. An inlet duct to the compressor feeds ambient air and possibly injected water to the compressor. The inlet duct may have, for example, ducts, filters, screens, and sound absorbing devices that contribute to a pressure loss of ambient air flowing through the inlet duct into inlet guide vanes of the compressor. An exhaust duct for the turbine 105 directs combustion gases from the outlet of the turbine 105 through, for example, emission control and sound absorbing devices. The amount of inlet pressure loss and back pressure may vary over time due to the addition of components to the inlet and exhaust ducts, and due to clogging of the inlet and exhaust ducts, for example from dust and dirt. The turbine 105 drives a generator that produces electrical power.

Turbine 105 operation may be monitored by one or more sensors detecting one or more observable conditions, or operating or performance parameters, of the turbine 105. In addition, external factors, such as the ambient environment can be measured by one or more sensors. In many instances, two or three redundant sensors may measure the same measured condition. For example, groups of redundant temperature sensors may monitor ambient temperature surrounding the turbine 105, the compressor discharge temperature, the turbine exhaust gas temperature, and other temperature measurements through the turbine 105. Similarly, groups of redundant pressure sensors may monitor the ambient pressure, and the static and dynamic pressure levels at the compressor inlet and outlet, at the turbine exhaust, at other locations through the turbine. Groups of redundant humidity sensors, for example, wet and dry bulb thermometers, measure ambient humidity in the inlet duct of the compressor. Groups of redundant sensors may also comprise flow sensors, speed sensors, flame detector sensors, valve position sensors, guide vane angle sensors, or the like that sense various parameters pertinent to the operation of turbine 105.

As used herein, "parameters" (such as "performance parameters" or "operating parameters") refer to items that can be used to define the operating conditions of the turbine, such as, but not limited to, temperatures, pressures, compressor pressure ratio, gas flows at defined locations in the turbine, load setpoint, firing temperature, as well as one or more conditions corresponding to the level of turbine or compressor degradation and/or the level of turbine or compressor efficiency. Some parameters are measured—they are capable of being sensed and may be directly known. Other parameters are estimated by the turbine models and are indirectly known. Still other parameters may represent hypothetical or future conditions and provided by an operator. The measured and estimated parameters may be used to represent a given turbine operating state.

A fuel control system may regulate the fuel flowing from a fuel supply to the combustor. The fuel controller may also select the type of fuel for the combustor. The fuel control system may be a separate unit or may be a component of the main controller.

The system 100 also includes one or more controllers 120a, 120b, which may each be a computer system having one or more processor that execute programs to control the operation of the turbine. Although FIG. 1A illustrates two controllers 120a, 120b, it is appreciated that a single controller 120 by be provided, or multiple controllers may be provided as illustrated, which may provide redundant and/or distributed processing (including redundant and/or distributed modeling of turbine behavior). The control actions may depend on, for example, sensor inputs or instructions from human operators. The programs executed by the controller 120 may include, for example, scheduling algorithms, such as those for regulating fuel flow to the combustor, managing grid compliance, turndown, etc. The commands generated by the controller 120 can cause actuators on the turbine to, for example, adjust valves via an actuator between the fuel supply and combustors that regulate the flow, fuel splits and type of fuel flowing to the combustors, adjust inlet guide vanes on the compressor via an actuator, or activate other control settings on the turbine.

Accordingly, the first controller 120a (which may be the same or different controller as the second controller 120b) is operable to model the turbine 105 by a first or primary model 110, including modeling the turbine's current performance parameters. The second controller 120b is operable to model turbine operating characteristics under different conditions via a second or predictive model 115. The first model 110 and the second model 115 may each be an arrangement of one or more mathematical representations of the turbine behavior (e.g., performance and operating parameters, etc.). Each of these representations may rely on input values to generate an estimated value of a modeled operating parameter and/or operating characteristics. In some circumstances, the mathematical representations may generate a surrogate operating parameter value that may be used in circumstances where a measured parameter value is not available. The first and the second models 110, 115 may be at least partially based on physics-based aero-thermodynamic computer models, regression-fit models, neural-net models, genetic algorithm models, or any other suitable computer model of a gas turbine. The first model 110 may then be utilized to provide a foundation and/or input to the second model 115 for determining turbine operating characteristics based on the current performance parameters of the turbine 105 and any other factors, such as external factors, operator supplied commands or conditions, and/or adjusted operating states. As described above, it is appreciated that "the second model 115" may simply be an instance of the same model as the first model 110 that considering additional or different inputs, such as external factors (e.g., temperature, humidity, pressure, etc.), different operating points, and/or to achieve or model different performance parameters or turbine behavior in light of the different inputs.

Figure 1B:
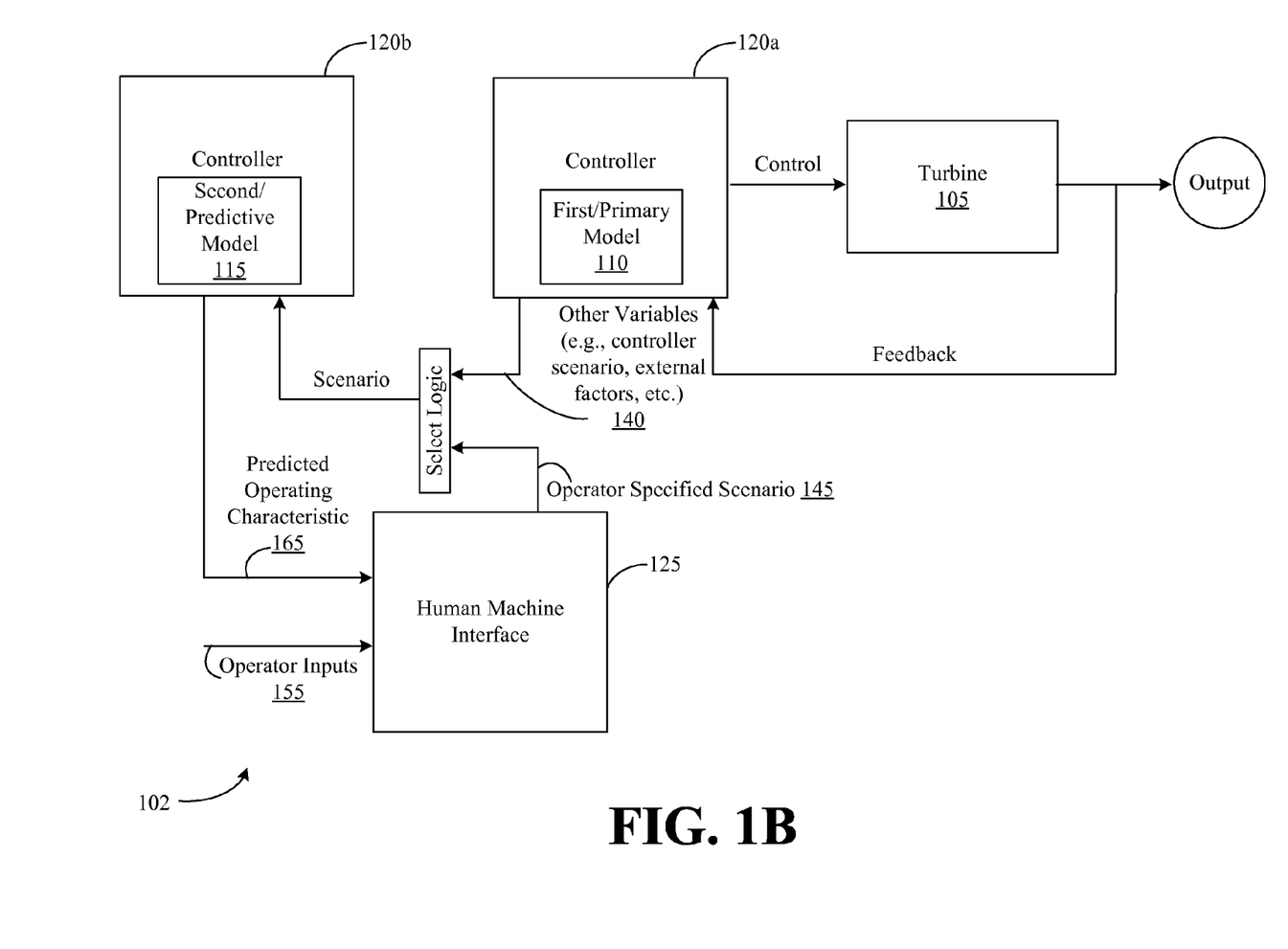

In another embodiment, a system 102 operable for modeling turbine operating behavior may further include a human machine interface ("HMI") 125 operable to both receive operator supplied commands and input and to present modeled behavior. The HMI 125 may be any known interface, such as a processor-based interface, operable to receive inputs and display or otherwise present (e.g., print, store, play, etc.) information to an operator.

With continued reference to FIG. 1A, a brief description of the interrelation between the system components is provided. As described, the first or primary model 110 models current performance parameters 130 of the turbine 105. These current performance parameters 130 may include, but are not limited to, conditions corresponding to the level of turbine degradation, conditions corresponding to the level of turbine efficiency (e.g., the heat rate or fuel to power output ratio), inlet guide vane angles, amount of fuel flow, turbine rotational speed, compressor inlet pressure and temperature, compressor exit pressure and temperature, turbine exhaust temperature, generator power output, compressor airflow, combustor fuel/air ratio, firing temperature (turbine inlet), combustor flame temperature, fuel system pressure ratios, and acoustic characteristics. Some of these performance parameters 130 may be measured or sensed directly from the turbine operation and some may be modeled based on other measured or sensed parameters. The performance parameters may be provided by the first model 110 and/or may be provided generally by the controller, such as if sensed and/or measured by the controller.

Upon generating the first model 110, the performance parameters 130 (which are intended to refer to any turbine behavior provided by the model) are provided for generating the second or predictive model 115. In addition, other variables 140 are provided to the second model 115, depending upon the intended use of the second model 115. For example, the other variables may include only external factors, such as temperature, barometric pressure, humidity, etc., that generally are uncontrollable and simply have to be accommodated. In addition, the other variables 140 may include a controller specified scenario or operating point (e.g., a turbine operating point generated by or otherwise provided via the controller 120, such as turbine control based on the first model 110, etc.), measured inputs, which may be some or al of the same measured inputs as described as possibly being modeled by the first model 110. As described with reference to FIG. 1B below, an operator supplied scenario 140 (e.g., one or more operator supplied commands indicating different turbine operating points or conditions) may also, or instead, be supplied to the second model 115 via operator inputs 155 provided by the human machine interface 125.

For example, as one use, the other variables 140 may include a controller specified scenario provided as one or more inputs to the second model 115 when attempting to model in real-time or near real-time current turbine behavior based on additional inputs, such as external factors or measured inputs. By utilizing a controller specified scenario of the first model in addition to one or more of these additional inputs, the expected real-time behavior of the turbine 105 can be modeled by the second model 115 taking into consideration these one or more additional inputs, which may in turn be utilized to control the turbine 105 or adjust the first model 110 by control profile inputs 160 provided from the second model 115 to the first model 110.

With reference to FIG. 1B, in another use, an operator specified scenario 145, can be provided as one or more inputs via the HMI 125 to the second or predictive model 115 when attempting to model or predict future turbine behavior under different conditions than the current conditions. For example, an operator may supply commands to the HMI 125 to generate a scenario in which the turbine 105 operates at a different operating point (e.g., different loads, different emissions, different efficiency, etc.). As an illustrative example, a set of operating conditions may be supplied via the operator specified scenario 145 that represent conditions that are expected for the following day (or other future timeframe), such as ambient conditions or demand requirements, which will then allow the second model 115 to generate expected turbine operating characteristics 165 for the turbine 105 operation on that future date. Upon running the second model 115 under the operator specified scenario, the modeled operating characteristics 165 represent turbine behavior such as, but not limited to, base load output capability, peak output capability, minimum turndown points, emissions levels, heat rate, and the like. These modeled or predicted operating characteristics 165 may be useful when planning and committing to power-production levels, such as for day-ahead market planning.

Figure 2:
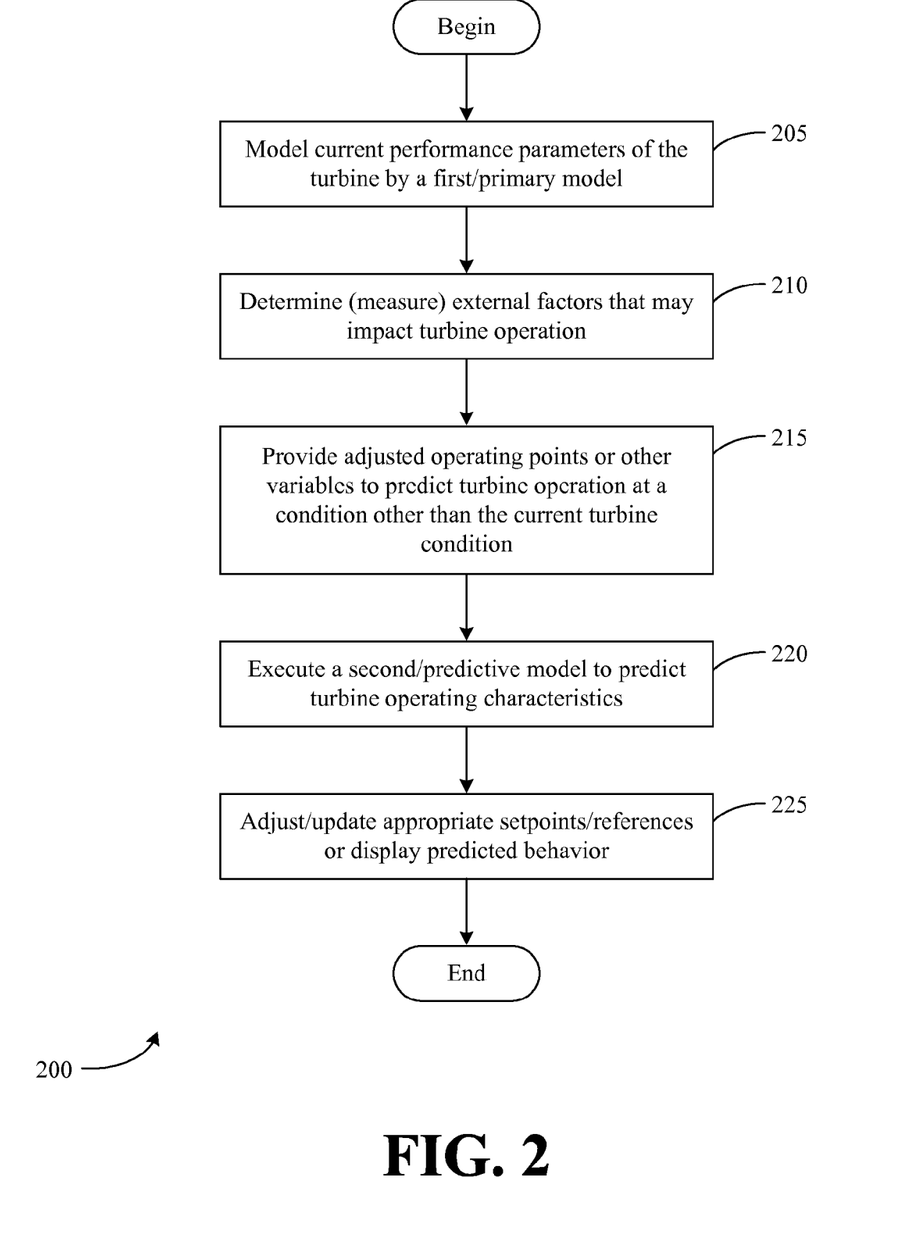
FIG. 2 is a flowchart illustrating a method for modeling a turbine, according to an example embodiment.

FIG. 2 illustrates an example method 200 by which an embodiment of the invention may operate. Provided is an example flowchart of the basic operation of a system for modeling a turbine, as may be executed by one or more controller, such as described with reference to FIGS. 1A-1B.

The method 200 may begin at block 205, in which the controller may model, by a first or primary model, one or more current performance parameters of a turbine according to the turbine's current operation. In order to generate this first model of the current turbine operation, the controller may receive as inputs to the model one or more operating parameters indicating the current operation of the turbine. As described above, these operating parameters may be sensed or measured and/or they may be modeled, such as may occur if the parameters cannot be sensed. The current performance parameters may include any parameter that is indicative of current turbine operation, as described above.

It is appreciated that the methods and systems disclosed herein do not directly depend on whether the operating parameters are measured or modeled. However, for example purposes, a general discussion of the methods and systems that may be used to model operating parameters is given. The controller may include, for example, a generated model of the gas turbine. The model may be an arrangement of one or more mathematical representations of the operating parameters. Each of these representations may rely on input values to generate an estimated value of a modeled operating parameter. The mathematical representations may generate a surrogate operating parameter value that may be used in circumstances where a measured parameter value is not available.

Following block 205 is block 210, in which the controller may receive or otherwise determine one or more external factors that may impact current and/or future operation of the turbine. As described above, these external factors are typically (but not required to be) uncontrollable, and therefore incorporating their influence in the second model is beneficial to generate the desired turbine control profile and/or operational behavior. External factors may include, but are not limited to, temperature, humidity, or barometric pressure, surrounding the turbine, as well as fuel composition and/or supply pressure, which may impact the turbine operational behavior. These external factors may be measured or sensed, may be estimated or otherwise provided manually by an operator (such as if the operator requests predicted behavior based on hypothetical scenarios or future conditions), and/or may be provided by third party information sources (e.g., weather services, etc.).

Following block 210 is block 215, in which the controller may receive adjusted operating points and/or other variables to predict turbine behavior at a condition different than the current turbine condition. Adjusted operating points may include, but are not limited, identifying the desired output level, such as if modeling the turbine at a reserved margin (e.g., 98% of base load), or if modeling the turbine at a peak load or during turndown, for example. Operating points may further include operating boundaries, such as, but not limited to, hot gas path durability (or firing temperature), exhaust frame durability, NOx emissions, CO emissions, combustor lean blow-out, combustion dynamics, compressor surge, compressor icing, compressor aero-mechanical limits, compressor clearances, and compressor discharge temperature. Thus, by providing these adjusted operating points or other variables, the operator may provide hypothetical scenarios for which the turbine model can predict the turbine's operating characteristics under those scenarios. As described above, this may be useful for controlling future operation of the turbine and/or for planning for future power generation and commitments.

Following block 215 is block 220, in which a second or predictive model of the turbine is generated based on the first model generated at block 205 and optionally the external factors and/or adjusted operating points or other variables provided at block 215. This second or predictive model thus accurately indicates or predicts the operating behavior (e.g., the performance parameters) of the turbine in light of these additional inputs.

Figure 3:
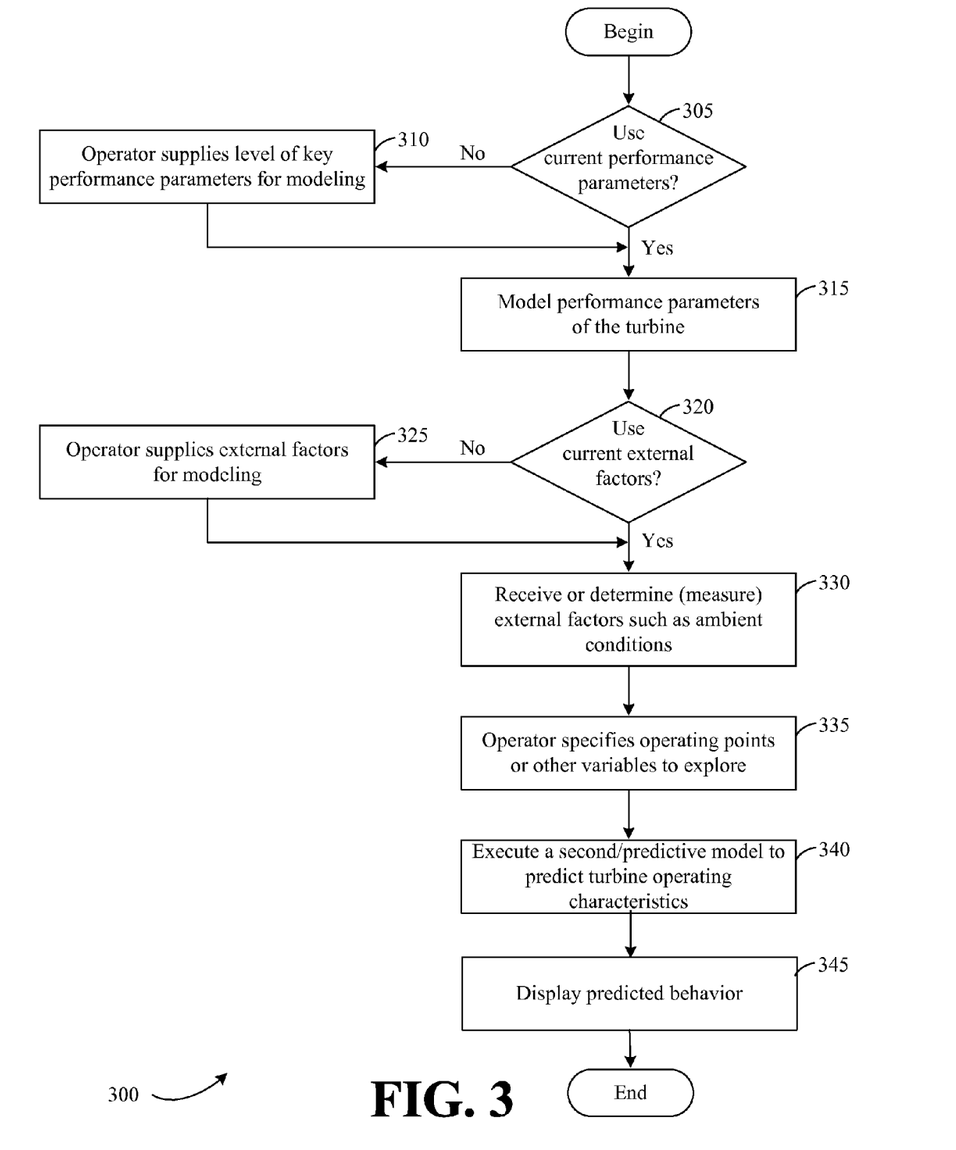
FIG. 3 is a flowchart illustrating a method for modeling a turbine, according to an example embodiment.

As described, at block 225, the modeled performance parameters may be utilized to adjust current turbine operation, adjust future turbine operation, and/or for display to an operator the modeled behavior. Accordingly, if adjusting current turbine operation, the turbine controller may receive the modeled performance parameters as inputs to alter a current control model (e.g., the first model) or a current control profile, such as by modifying various setpoints and/or references utilized for current turbine control. It is anticipated that this real-time or near real-time control of the turbine would be performed when the inputs to the second model generated at block 220 are representative of the current turbine conditions or current external factors. For example, real-time or near real-time adjustment at block 225 may be performed when the second model represents performance characteristics considering the current temperature, pressure, or humidity, and/or considering operating parameters or performance parameters of the turbine that more accurately represents turbine degradation and/or efficiency. FIG. 3 describes one example embodiment that may optionally receive operator specific inputs and generate predicted behavior under a different operating condition.

The output of the model generated at block 220 may also be displayed or otherwise presented to an operator via an HMI. For example, in one embodiment in which the operator provides hypothetical operating scenarios at block 215, the predicted turbine operating characteristics can be displayed for analysis and possible inclusion in future control or planning activities. Presentation may be accomplished by, but is not limited to, graphical, textual, and/or audible presentation at the HMI (or any other user interface).

Accordingly, the method 200 may end after block 225, having modeled the current performance parameters of a turbine by a first model, and then modeled the same turbine in consideration of additional external factors, adjusted operating points, or other additional data to predict turbine operating characteristics based on this additional data.

FIG. 3 illustrates an example method 300 by which an embodiment of the invention may operate. Provided is an example flowchart of the operation of a system for modeling a turbine, as may be executed by one or more controller, such as described with reference to FIGS. 1A-1B. According to this example, the method 300 illustrates use of the system 100 in which an operator may optionally supply additional variables to utilize the modeling capabilities to predict turbine behavior under hypothetical scenarios.

The method 300 may begin at decision block 305, in which it is determined whether the turbine is to be modeled according to current turbine operating parameters and performance parameters, or if operator supplied parameters are to be considered when generating the model. For example, if the system is being utilized to predict hypothetical operating scenarios, then current performance parameters may not be needed as inputs to the model (assuming the model already reflects basic turbine operation and behavior). Accordingly, if it is determined at decision block 305 that current parameters are not to be utilized, then operations proceed to block 310 in which the operator supplies different performance parameters, allowing for modeling the turbine under a different operating point and in a different operating condition (e.g., in a more degraded state, at a different level of efficiency, etc.). Otherwise, the current performance parameters and/or operating parameters are utilized, such as is described with reference to block 205 of FIG. 2, and operations continue to block 315.

At block 315, the controller may model, by a first or primary model, one or more performance parameters of a turbine either according to the operator supplied input from block 310 or the turbine's current operation. For example, if the model is generated based at least in part on operator supplied parameters at block 310, then the model generated at block 315 is representative of predicted turbine behavior under those performance parameters.

Following block 315 is decision block 320, in which it is determined whether subsequent modeling (e.g., the "second model" or the "predictive model") is to be based on current external factors, such as current temperature, pressure, or humidity, or on different external factors supplied by the operator. For example, in one scenario, the controller can model turbine operating behavior based on the additional data of one or more current external factors, which would allow further prediction of turbine behavior in light of the current conditions. In another scenario, however, the controller can be utilized to further model the turbine according to operator supplied conditions, which allows the predicting turbine operating characteristics under various hypothetical scenarios. Accordingly, if it is determined at block 320 that operator supplied external factor data is to be considered when modeling, then operations continue to block 325. Otherwise, operations continue to block 330 utilizing current external factors.

At block 330 the controller receives external factors to be considered when generating the second or predictive model, whether they be representative of the current state or hypothetical factors provided by the operator at block 325. Following block 330 are blocks 335-345, which optionally permit consideration of different operating points or other variables, generating the predictive model based on the received data, and displaying the predicted behavior, respectively, in the same or similar manner as is described with respect to blocks 215-225 of FIG. 2.

Accordingly, the method 300 may end after block 345, having modeled turbine operating behavior optionally based on operator supplied scenarios.

Figure 4:
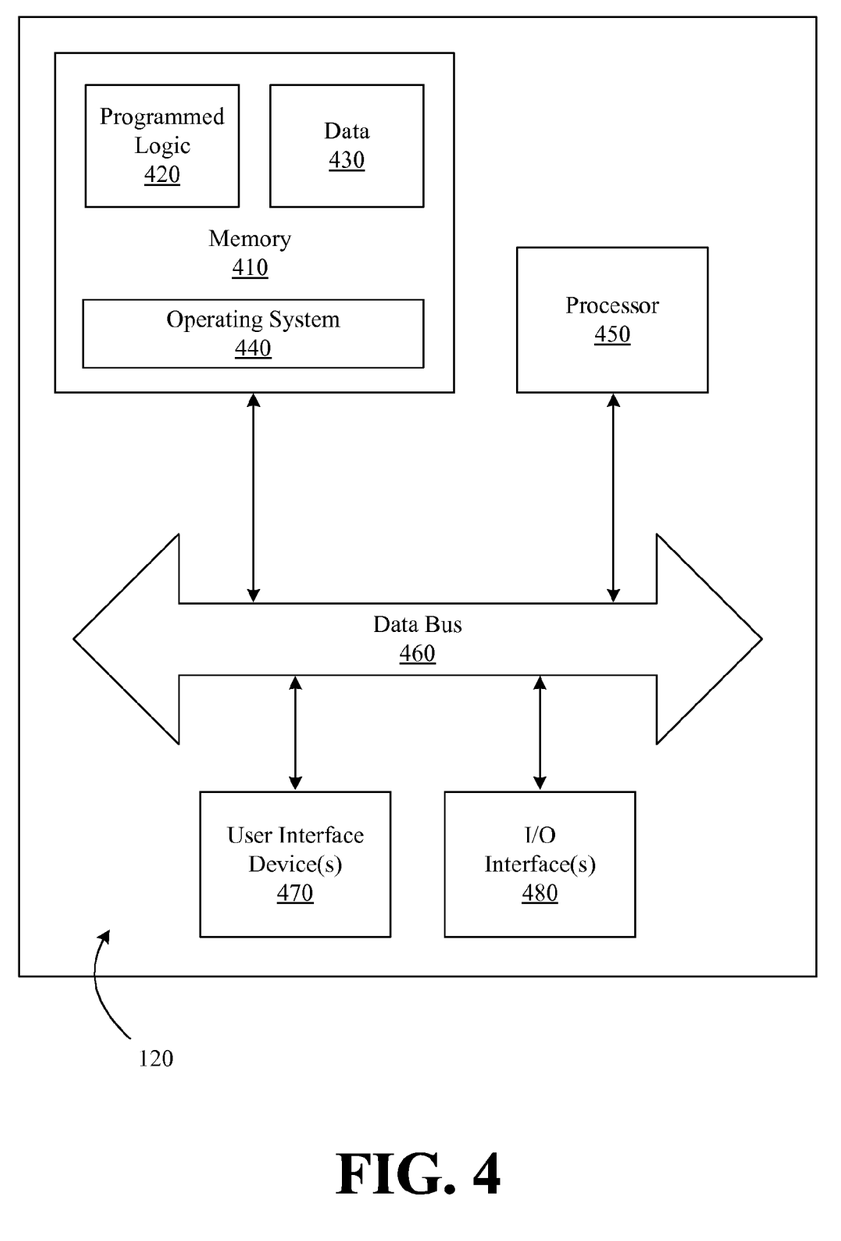
FIG. 4 is block diagram illustrating a controller for modeling and/or controlling a turbine, according to an example embodiment.

FIG. 4 illustrates by way of a block diagram an example controller 120 used to implement modeling turbine operation, according to an illustrative embodiment. More specifically, the elements of the computerized controller 120 may be used to generate the first and/or the second models, as described with reference to FIGS. 1-3, in addition to facilitate turbine control, receive operator input (e.g., via an HMI), and/or present modeled output (or any other system output). The computerized controller 120 may include a memory 410 that stores programmed logic 420 (e.g., software) and may store data 230, such as sensed operating parameters, modeled operating parameters, operating boundaries and goals, operating profiles, and the like. The memory 410 also may include an operating system 440. A processor 450 may utilize the operating system 440 to execute the programmed logic 420, and in doing so, also may utilize the data 430. A data bus 460 may provide communication between the memory 410 and the processor 450. Users may interface with the controller 120 via at least one user interface device 470 such as a keyboard, mouse, control panel, or any other devices capable of communicating data to and from the controller 120. The controller 120 may be in communication with the gas turbine online while operating, as well as in communication with the gas turbine offline while not operating, via an I/O Interface 480. More specifically, one or more of the controllers 120 may carry out the execution of the model-based control system, such as, but not limited to, sense, model, and/or receive operating parameters and performance parameters; generate a first turbine model reflecting current turbine operation; sense, model, and/or receive external factor information; receive additional operator input and variables; generate a second turbine model reflecting turbine operation in light of the additional data supplied; control current or future turbine operation; and/or present modeled operating characteristics. Additionally, it should be appreciated that other external devices or multiple other gas turbines may be in communication with the controller 120 via the I/O Interface 470. In the illustrated embodiment, the controller 120 may be located remotely with respect to the gas turbine; although, it may be co-located or even integrated with the gas turbine. Further the controller 120 and the programmed logic 420 implemented thereby may include software, hardware, firmware, or any combination thereof. It should also be appreciated that multiple controllers 120 may be used, whereby different features described herein may be executed on one or more different controllers 120.

Accordingly, embodiments described herein allow utilizing turbine models to indicate turbine behavior and corresponding operating parameters of an actual turbine, in addition to predicting turbine behavior taking into consideration the current performance parameters and one or more external factors identified. These embodiments, therefore, provide a technical effect of indicating or predicting turbine behavior at operating points or operating conditions different than the current turbine operation. Moreover, by modeling the turbine operating behavior utilizing a second model that considers the external factors or different operating conditions, an additional technical effect can be provided to adjust turbine control to more effectively and efficiently operate under these different operating conditions or in light of the external factors considered. Yet an additional technical effect is provided that allows automated turbine control based at least in part on modeled behavior and operating characteristics, which may optionally include creating operator specified scenarios, inputs, operating points, and/or operating conditions to predict turbine behavior and operating characteristics at these operator specified conditions. A further technical effect realized includes the ability to predict various hypothetical scenarios allows operators to make more informed control and operating decisions, such as scheduling, loading, turn-down, etc.

References are made to block diagrams of systems, methods, apparatus, and computer program products according to example embodiments of the invention. It will be understood that at least some of the blocks of the block diagrams, and combinations of blocks in the block diagrams, respectively, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the block or blocks.

One or more components of the systems and one or more elements of the methods described herein may be implemented through an application program running on an operating system of a computer. They also may be practiced with other computer system configurations, including hand-held devices, multiprocessor systems, microprocessor based, or programmable consumer electronics, mini-computers, mainframe computers, etc.

Application programs that are components of the systems and methods described herein may include routines, programs, components, data structures, etc. that implement certain abstract data types and perform certain tasks or actions. In a distributed computing environment, the application program (in whole or in part) may be located in local memory, or in other storage. In addition, or in the alternative, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated the invention may be embodied in many forms and should not be limited to the example embodiments described above. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A method for modeling turbine operation, comprising:
   determining current performance parameters of a turbine, wherein the current performance parameters are provided to a predictive model;
   providing at least one external factor for current or future operation of the turbine; and
   modeling, by the predictive model, at least one operating characteristic of the turbine based at least in part on the current performance parameters of the turbine and the at least one external factor.

2. The method of claim 1, wherein determining the current performance parameters of the turbine comprises modeling, by a primary model, the current performance parameters of the turbine.

3. The method of claim 2, wherein the predictive model is based at least in part on at least one output from the primary model.

4. The method of claim 1, wherein the at least one external factor comprises at least one of: (a) ambient temperature; (b) ambient pressure; (c) ambient humidity; or (d) fuel composition.

5. The method of claim 1, wherein modeling the current performance parameters of the turbine comprises modeling at least one of: (a) a condition associated with turbine degradation; or (b) a condition associated with turbine efficiency.

6. The method of claim 1, wherein modeling the at least one operating characteristic comprises modeling at least one of: (a) turbine output; (b) exhaust temperature; (c) heat rate; (d) fuel consumption; or (e) emissions data for a supplied operating point and based at least in part on the modeled performance parameter of the turbine and the at least one external factor.

7. The method of claim 1, wherein the at least one external factor comprises at least one external factor during the current operation of the turbine, wherein determining the at least one operating characteristic comprises determining at least one operating characteristic for the current operation of the turbine, and further comprising:
   adjusting operation of the turbine based on the at least one operating characteristic for the current operation of the turbine, wherein the adjusting is provided via automation or by one or more operator supplied commands to adjust at least one operating point.

8. The method of claim 1, further comprising:
   determining a desired turbine operating point different from the current operation of the turbine; and
   determining, based on the at least one operating characteristic of the turbine, that the current operation of the turbine does not satisfy the desired turbine operating point;
   wherein the desired turbine operating point is dependent on the at least one modeled operating characteristic of the turbine.

9. The method of claim 8, wherein the desired turbine operating point comprises one of: (a) a fraction of a base load output capability; (b) a turndown point; or (c) a peak fire point.

10. The method of claim 1, wherein providing the at least one external factor comprises providing at least one external factor for future operation of the turbine, wherein modeling the at least one operating characteristic of the turbine comprises modeling a future operating characteristic of the turbine based at least in part on the at least one external factor for future operation of the turbine, and further comprising:
   outputting the at least one operating characteristic for future operation.

11. The method of claim 10, further comprising:
   receiving the at least one external factor for future operation of the turbine as an operator supplied command via a human machine interface.

12. The method of claim 10, wherein determining the performance parameters of the turbine further comprises:
   receiving one or more operator supplied performance parameters.

13. A system for modeling turbine operation, comprising:
   at least one controller in communication with a turbine configured to:
      determine current performance parameters of the turbine, wherein the current performance parameters are provided to a predictive model;
      provide at least one external factor for current or future operation of the turbine; and
      model, by the predictive model, at least one operating characteristic of the turbine based at least in part on the modeled current performance parameters of the turbine and the at least one external factor.

14. The system of claim 13, wherein the at least one controller is further configured to model, by a primary model, the current performance parameters of the turbine.

15. The system of claim 14, wherein the predictive model is based at least in part on at least one performance parameter modeled by the primary model.

16. The system of claim 13, wherein the at least one controller is further configured to adjust operation of the turbine based on the at least one operating characteristic modeled by the predictive model.

17. The system of claim 13, further comprising a human machine interface, wherein the at least one controller is further configured to present to the human machine interface the at least one operating characteristic.

18. The system of claim 17, wherein the human machine interface is further configured to receive one or more operator supplied commands, and wherein the predictive model is based at least in part on the one or more operator supplied commands.

19. A method for modeling a turbine, comprising:
   receiving a plurality of operating parameters associated with the current operation of the turbine, wherein the plurality of operating parameters are provided to a primary model;
   modeling, by the primary model, current performance parameters of the turbine based at least in part on the plurality of operating parameters;
   receiving a determination of at least one external factor;
   providing, as inputs to a predictive model, one or more outputs of the primary model and the at least one external factor, wherein the one or more outputs reflect the current operating state of the turbine; and
   modeling, by the predictive model, at least one operating characteristic of the turbine, wherein the at least one operating characteristic of the turbine is based at least in part on the current operating state of the turbine and the at least one external factor.

20. The method of claim 19, wherein the at least one external factor comprises one of: (a) a representation of at least one current external factor; or (b) a representation of at least one future external factor; and wherein:
   if the at least one external factor represents at least one current external factor, the at least one operating characteristic represents at least one current operating characteristic of the turbine; and
   if the at least one external factor represents at least one future external factor, the at least one operating characteristic represents at least one future operating characteristic of the turbine.

* * * * *